(12) United States Patent
 Simstad

(10) Patent No.: US 10,802,576 B2
(45) Date of Patent: Oct. 13, 2020

(54) DEVICES AND METHODS OF REAL-TIME MAPPING OF A USER'S BODY MOTIONS

(71) Applicant: Timothy Allen Simstad, Whiting, IN (US)

(72) Inventor: Timothy Allen Simstad, Whiting, IN (US)

( * ) Notice: Subject to any disclaimer, the term of this patent is extended or adjusted under 35 U.S.C. 154(b) by 0 days.

(21) Appl. No.: 16/235,658

(22) Filed: Dec. 28, 2018

(65) Prior Publication Data

US 2019/0204905 A1 Jul. 4, 2019

Related U.S. Application Data

(60) Provisional application No. 62/611,914, filed on Dec. 29, 2017.

(51) Int. Cl.
 *G06F 3/01* (2006.01)
 *G06F 1/16* (2006.01)

(52) U.S. Cl.
 CPC .............. *G06F 3/011* (2013.01); *G06F 1/163* (2013.01); *G06F 3/014* (2013.01); *G06F 3/017* (2013.01)

(58) Field of Classification Search
 CPC .......... G06F 3/011; G06F 1/163; G06F 3/014; G06F 3/017
 See application file for complete search history.

(56) References Cited

U.S. PATENT DOCUMENTS

| | | | |
|---|---|---|---|
| 2012/0266358 A1* | 10/2012 | Yuen | A61B 5/7475 2/162 |
| 2013/0288761 A1* | 10/2013 | Santos Paiva Ferraz Conceicao | A63F 13/00 463/7 |
| 2013/0328770 A1* | 12/2013 | Parham | G06F 3/0488 345/157 |
| 2014/0070957 A1* | 3/2014 | Longinotti-Buitoni | A61B 5/6804 340/870.01 |
| 2015/0075303 A1* | 3/2015 | Connor | A61B 5/1126 73/865.4 |
| 2015/0309563 A1* | 10/2015 | Connor | G06F 3/011 73/865.4 |
| 2015/0370320 A1* | 12/2015 | Connor | A61B 5/6831 345/173 |
| 2016/0202755 A1* | 7/2016 | Connor | A61B 5/1126 73/865.4 |
| 2016/0338644 A1* | 11/2016 | Connor | A61B 5/4528 |
| 2017/0232300 A1* | 8/2017 | Tran | H04L 67/12 434/247 |
| 2018/0020978 A1* | 1/2018 | Kaifosh | G06K 9/6287 702/150 |
| 2018/0081439 A1* | 3/2018 | Daniels | G06F 3/015 |

* cited by examiner

*Primary Examiner* — Afroza Chowdhury
(74) *Attorney, Agent, or Firm* — Hartman Global IP Law; Gary M. Hartman; Domenica N. S. Hartman

(57) ABSTRACT

Devices and methods of real-time mapping of a user's body. The devices and methods involve a user wearing one or more wearable article(s) of a frame such that sensing devices of the wearable article(s) are located on one or more section(s) of the user's body. Signals are transmitted with the sensing devices and received with at least one control unit. Movement of the section(s) of the user's body are determined based on the signal, and motion data are provided to a virtual environment based on the movement of the section (s) of the user's body.

20 Claims, 2 Drawing Sheets

DEVICES AND METHODS OF REAL-TIME MAPPING OF A USER'S BODY MOTIONS

CROSS REFERENCE TO RELATED APPLICATIONS

This application claims the benefit of U.S. Provisional Application No. 62/611,914, filed Dec. 29, 2017, the contents of which are incorporated herein by reference.

BACKGROUND OF THE INVENTION

The present invention generally relates to manipulation of virtual environments. The invention particularly relates to devices that include a frame including a wearable array of sensing devices and controllers that are capable of capturing motions of a user's body and converting the motions into data for digital environments.

Technologies, for example, gaming technologies, conventionally utilize hand-held devices to mimic an approximation of the location of the hands in relation to a defined fixed point and thus allow for rough interaction with digital environments. However, the points of control may be limited to the head and hands and may only provide rudimentary control in virtual environments.

In view of the above, it can be appreciated that there is an ongoing desire for devices and/or methods of real-time mapping of a user's body motions and for precise determination of the location and orientation of the body that can be converted into virtual environments.

BRIEF DESCRIPTION OF THE INVENTION

The present invention provides devices and methods of real-time mapping of a user's body and converts a user's motion data into a digital environment.

According to one aspect of the invention, a device is provided that includes a frame having at least one wearable article configured to be worn by a user and at least one control unit. The wearable article has at least one sensing device configured to transmit a signal, and the at least one control unit is configured to receive the signal, determine movement of the user based on the signal, and provide motion data to a virtual environment based on the movement of the user.

According to another aspect of the invention, a method is provided for real-time mapping of a user's body that includes wearing at least a first wearable article of a frame such that at least one sensing device of the first wearable article is located on a first section of the user's body, transmitting a signal with the at least one sensing device, and receiving the signal with at least one control unit of the frame. Movement of the first section of the user's body is determined based on the signal, and motion data are provided to a virtual environment based on the movement of the first section of the user's body.

According to another aspect of the invention, a method is provided for real-time mapping of a user's body that includes wearing one or more wearable article(s) of a frame on at least the user's torso, arms, and legs such that sensing devices of the wearable article(s) are located on the user's torso, arms, and legs. Each of the sensing devices is mapped to corresponding portions of a virtual skeleton frame of an avatar within a virtual environment. Signals are transmitted with each of the sensing devices, and received with at least one control unit of the frame. Movement of the user's torso, arms, and legs are determined based on the signals, and motion data comprising the position and orientation of the user's torso, arms, and legs are provided to a virtual environment based on the movement of the user's torso, arms, and legs such that the avatar within the virtual environment is manipulated based on the motion data.

Technical effects of the device and methods described above preferably include the capability of manipulating a virtual environment with a user's physical body movements in real-time.

Other aspects and advantages of this invention will be further appreciated from the following detailed description.

DETAILED DESCRIPTION OF THE INVENTION

Figure 1:
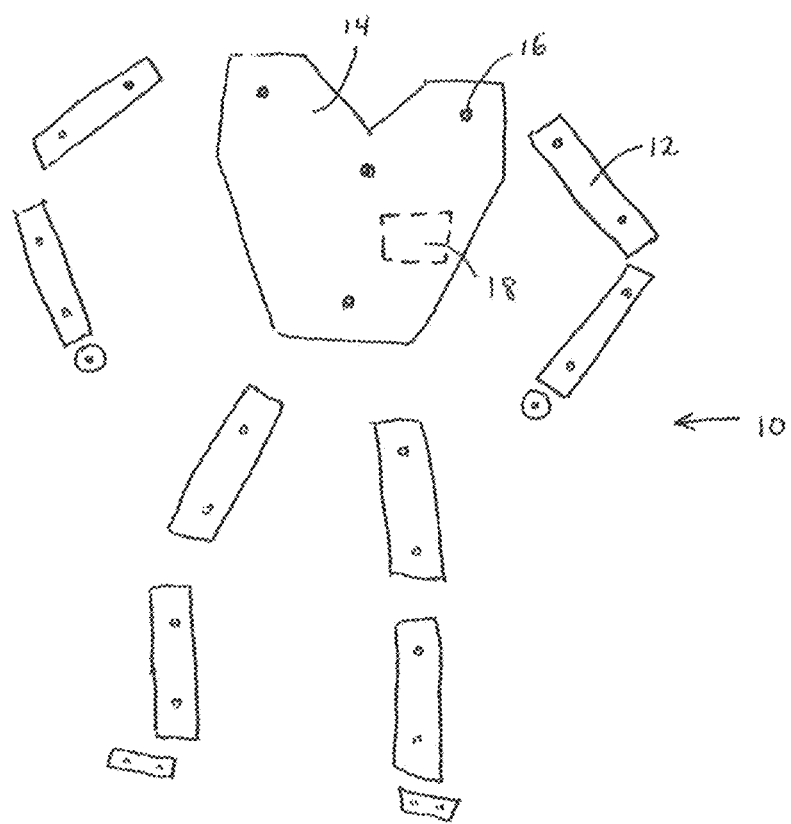
FIG. 1 schematically represents a device in accordance with a first nonlimiting embodiment of the invention.

The invention particularly relates to devices that include a frame having an array of sensing devices and at least one control unit that is configured to receive and coordinate input from the sensing devices. The frame includes wearable pieces or articles configured to be worn by a user, and one or more sensing devices may be located within each wearable article. Each of the sensing devices transmits a signal which is received by the control unit and used to track the position of the sensing devices which corresponds to the real-time position and orientation of the user's body. The movement of the sensing devices may be tracked relative to the control unit, each other, another device, or a fixed point (e.g., determined during calibration). According to one embodiment, the sensing devices include radio frequency units, or RF units, that transmit a radio frequency signal. The wearable articles may be placed on the user's body by any suitable means including, but not limited to, straps, sleeves, bands, etc. Suitable wearable articles include, for example, gaming articles and wearable articles for medical and military applications.

During use, the frame provides positional tracking of the individual sensing devices within the wearable articles to determine the location and orientation of one or more sections of the user's body in three dimensions, for example, the exact location and orientation of each limb in three dimensions. Preferably, the array of sensing devices is positioned along multiple sections of the user's body, for example, following the long bones of the limbs and key points on the torso, hands, and/or feet. In such an embodiment, the frame may be able to accurately map the position and orientation of all tracked limbs independently in real-time. In particular, providing more than one sensing device along a long bone may allow for tracking both position and orientation of the associated limb in three dimensions. In general, precision of the motion data increases with an increasing number of sensing devices within the array.

The control unit receives and coordinates the input from the sensing units and operates as an interface that provides user motion data to one or more three-dimensional virtual environment(s). The control unit may include a central processing unit (CPU), memory, a receiver for receiving input data from the sensing devices, a transmitter for communicating with a remote host, and/or any other components necessary for receiving, interpreting, and/or transmitting user motion data to a virtual environment. In a nonlimiting embodiment, a virtual environment may be running on a remote dedicated host and the control unit may be configured to wirelessly transmit user motion data to the host via Wi-Fi or other digital communications methods such that the host may implement the user motion data into the virtual environment. The control unit may also provide ad-hoc connectivity to additional frame controllers or controllers built into accessories configured to operate in combination with the frame.

The control unit may include a software application programming interface, or software API, configured to convert motions captured by the frame into usable data for digital virtual environments. This may be accomplished by using the natural mechanical properties of the human muscular-skeleton system as a basis for the motion tracking system. For example, the virtual environment may include a virtual frame (e.g., a skeletal model of a virtual avatar) and position and/or orientation data from the sensing devices may be correlated to corresponding fixed locations on the virtual frame. In this manner, movement of the user's body may be mapped in real-time to the virtual frame such that the user is capable of controlling the virtual frame with the movement of their body. In the above example, the virtual frame may or may not be structurally similar to the human skeleton system. If the virtual frame mimics the human skeleton system, the locations of the sensing devices preferably are mapped to the same locations on the virtual frame. This type of motion integration is believed to be compatible with many popular modeling and animation software programs.

As such, the frame provides for a method for real-time mapping of a user's body that includes wearing a frame having at least one sensing device, and at least one control unit that is configured to coordinate input from the at least sensing device and provide an interface for converting the user's motion data into a digital environment.

FIG. 1 represents a first nonlimiting embodiment of a frame 10 that includes a vest 14 and multiple sensing bars 12 that include sensing units 16 and are configured to be worn by a user. For example, a user may locate the vest 14 over their torso and each of the individual sensing bars 12 along sections of their body, for example, along their arms, legs, hands, and/or feet. A control unit 18 is located within or on the vest 14.

The sensing bars 12 may be made of materials that do not impede a signal transmitted by the sensing devices 16 (e.g., a radio frequency signal) and maintain their shape over relatively long periods of time. Suitable sensing bar materials include, for example, without limitation, plastics. The sensing bars 12 may be rigid or flexible, and may provide for their respective sensing devices 16 to be located in fixed or adjustable locations relative to one another. For example, an individual sensing bar 12 may include a rigid body configured to be located on a user's limb and having at least two sensing devices 16 intended to be located in relatively fixed locations along the user's limb while worn. The sensing bars 12 may be attached to a user's body by various means including straps or bands, etc.

Figure 2:
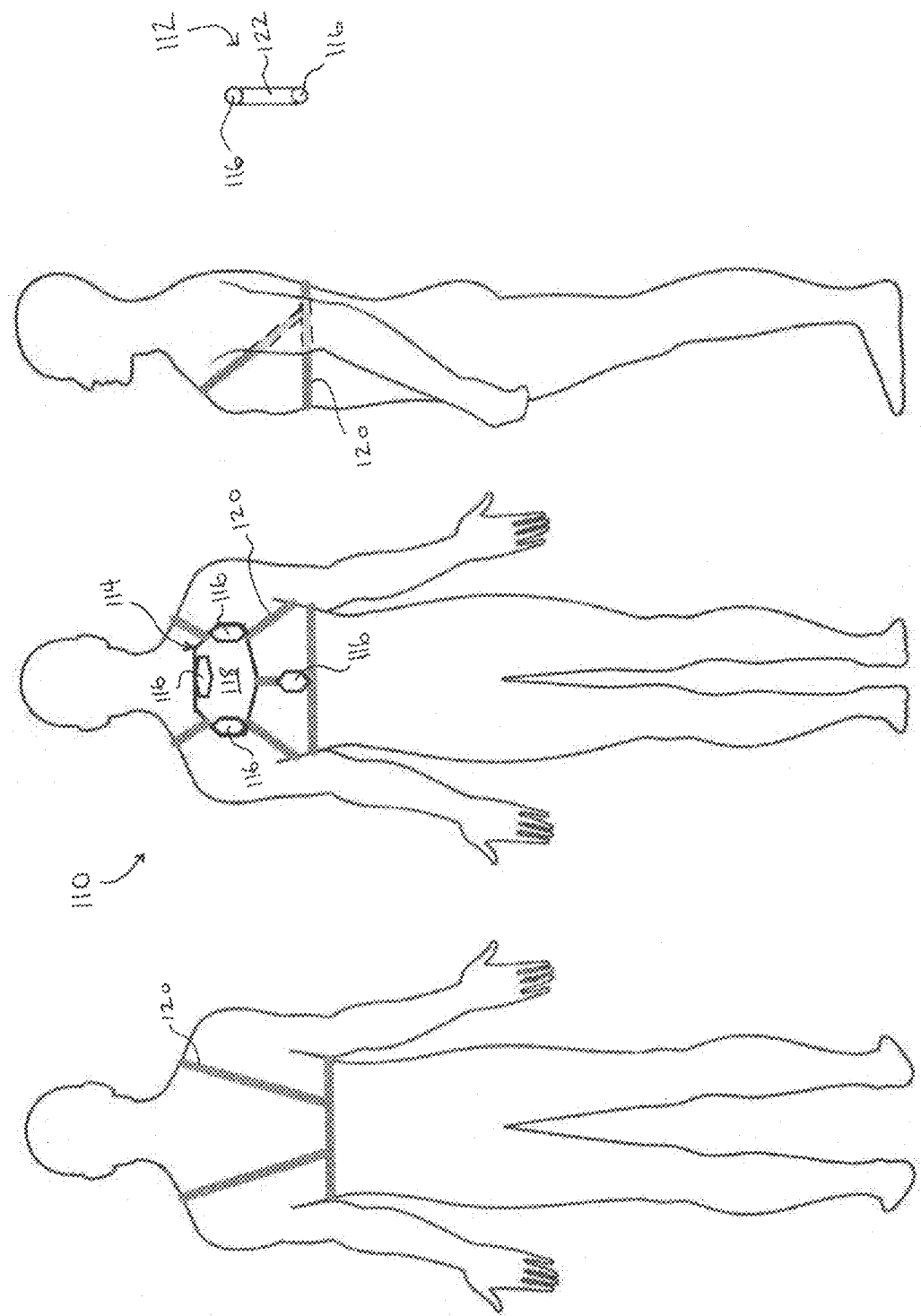
FIG. 2 schematically represents a device in accordance with a second nonlimiting embodiment of the invention.

FIG. 2 represents a second nonlimiting embodiment of a frame 110 that includes a chest unit 114 and one or more sensing band(s) 112. The chest unit 114 includes sensing devices 116 and a control unit 118, and may be secured to a user's torso with straps 120 as represented. In particular, the straps 120 are configured to be located around the user's torso, under the user's arms, and over the user's shoulders. An addition strap 120 connects the chest unit 114 to another strap 120 (i.e., wrapped around the user's torso) and further couples to another sensing device 134. The sensing band(s) 112 include sensing devices 116 connected with a band 122 configured to be worn on a section of a user's body, for example, on a limb, hand, foot, or head. In one embodiment, the band 122 is formed of an integral elastic material. For example, the band 122 may be an elastic hoop configured to encircle a user's limb and apply pressure thereto to remain in a fixed located thereon. In another embodiment, the band 122 includes a fastener for coupling to the user or to itself. For example, the band 122 may be a strap having corresponding hook and loop fasteners on ends thereof configured to wrap around a user's limb.

The frames 10 and 110 may include additional accessories configured to communicate with the controllers 18 and 118, and may be operable with only one, all, or some of their individual components that include sensing devices 16 and 116 (e.g., sensing bars 12, sensing bands 112, and/or accessories). Any of the components of the frames 10 and 110 may be integrated into wearable articles such as shirts, pants, hats, sleeves, socks, etc. In addition, multiple components could be integrated into a single wearable article, for example, a long sleeve shirt that includes sensing devices 16 and 116 associated with the user's torso, upper arms, and forearms. The frames 10 and 110 may be capable of tracking a user's finger movement, for example, with gloves having sensing devices 16 and 116 in one or more fingers thereof.

It should be noted that the drawings are not necessarily to scale and the relative dimensions of the components to one another and to the user are exemplary, but are otherwise not necessarily limitations to the scope of the invention. While the above description corresponding to providing motion data to a virtual environment, it is also foreseeable that the frames and methods described herein may be applicable to direct motion control of real objects such as but not limited to props, robotics, and industrial equipment.

While the invention has been described in terms of specific or particular embodiments, it should be apparent that alternatives could be adopted by one skilled in the art. For example, the frames 10 and 110 and their components could differ in appearance and construction from the embodiments described herein and shown in the drawings, functions of certain components of the frames 10 and 110 could be performed by components of different construction but capable of a similar (though not necessarily equivalent) function, process parameters could be modified, and appropriate materials could be substituted for those noted. In addition, the invention encompasses additional or alternative embodiments in which one or more features or aspects of a particular embodiment could be eliminated or two or more features or aspects of different disclosed embodiments may be combined. It should also be understood that the phraseology and terminology employed above are for the purpose of describing the illustrated embodiments, and do not necessarily serve as limitations to the scope of the invention. Therefore, the scope of the invention is to be limited only by the following claims.

The invention claimed is:

1. A device having a frame comprising at least a first wearable article configured to be worn by a user and at least one control unit, the first wearable article comprising a sensing bar and the first wearable article being configured so that the sensing bar extends along a bone of a limb of the user when the first wearable article is worn by the user, the sensing bar having at least a first sensing device between oppositely-disposed longitudinal ends of the sensing bar to locate the first sensing device at a fixed location along and relative to the bone of the limb of the user when the first wearable article is worn by the user and enable the first sensing device to track the position and orientation of the limb of the user in three dimensions by sensing the position and orientation of the fixed location of the sensing device in three dimensions, wherein the first sensing device is configured to transmit a signal corresponding to the position and orientation of the fixed location, and the at least one control unit is configured to receive the signal, determine movement of the user based on the signal of the first sensing device, and provide motion data to a virtual environment based on the movement of the user.

2. The device of claim 1, wherein the frame includes at least a second wearable article configured to be worn by the user, the second wearable article having at least one sensing device and configured to be worn on a section of the user's body, wherein the frame provides positional tracking of the at least one sensing device of the second wearable article to determine the location of the section of the user's body.

3. The device of claim 2, wherein the second wearable article and the at least one sensing device are configured to provide orientation tracking of the at least one sensing device of the second wearable article to determine the orientation of the section of the user's body.

4. The device of claim 1, wherein the sensing bar of the first wearable article has at least a second sensing device at a second fixed location between the longitudinal ends of the sensing bar and relative to the first sensing device and along and relative to the bone of the limb to enable the second sensing device to track the position and orientation of the limb of the user in three dimensions by sensing the position and orientation of the second fixed location in three dimensions.

5. The device of claim 2, wherein the second wearable article includes a band configured to be worn on one of the user's limbs such that the band encircles a portion of the limb.

6. The device of claim 1, wherein the first wearable article comprises the sensing bar, the first sensing device, and straps for securing the first wearable article to the limb of the user.

7. The device of claim 2, wherein the second wearable article includes a chest unit that is configured to be secured to the user's torso with straps that are located around the user's torso, under the user's arms, and over the user's shoulders.

8. The device of claim 2, wherein the second wearable article is configured to be worn on one of the user's hands and the at least one sensing device thereof is associated with a first of the user's fingers, the control unit configured to provide finger tracking of the at least one sensing device of the second wearable article to determine the position of the first finger.

9. The device of claim 1, wherein the frame includes multiple wearable articles configured to be worn on at least the user's torso, arms, and legs, and the frame provides positional tracking of sensing devices of each of the multiple wearable articles to determine the locations of the user's torso, arms, and legs.

10. The device of claim 9, wherein the frame includes additional wearable articles configured to be worn on the user's hands and feet, and the frame provides positional tracking of sensing devices of each of the additional wearable articles to determine the locations of the user's hands and feet.

11. The device of claim 9, wherein the frame is configured to provide orientation tracking of the sensing devices of each of the multiple wearable articles to determine the orientation of the user's torso, arms, and legs.

12. The device of claim 1, wherein the first sensing device is a radio frequency unit and the signal is a radio frequency signal.

13. A method for real-time mapping of a user's body, the method comprising:
wearing at least a first wearable article of a frame such that at least a first sensing device of the first wearable article is located at a fixed location along and relative to a bone of a limb of the user's body to enable the first sensing device to track the position and orientation of the limb of the user in three dimensions by sensing the position and orientation of the fixed location of the first sensing device in three dimensions;
transmitting a signal with the first sensing device;
receiving the signal with at least one control unit mounted to at least a second wearable article of the frame;
determining the position and orientation of the limb of the user based on the signal; and
providing motion data to a virtual environment based on the position and orientation of the limb of the user.

14. The method of claim 13, wherein the motion data include real-time tracking of the position and orientation of the limb of the user.

15. The method of claim 13, further comprising:
wearing at least a second wearable article of the frame such that at least one sensing device of the second wearable article is located on a second section of the user's body;
transmitting a signal with the at least one sensing device of the second wearable article;
receiving the signal from the at least one sensing device of the second wearable article with the at least one control unit of the frame;
determining movement of the second section of the user's body based on the signal;
providing motion data to a virtual environment based on the movement of the second section of the user's body.

16. The method of claim 15, wherein the second wearable article comprises the control unit and is worn on the user's torso.

17. The method of claim 16, wherein the second wearable article is secured to the user's torso with straps that are located around the user's torso, under the user's arms, and over the user's shoulders.

18. The method of claim 15, wherein the second wearable article is worn on one of the user's hands, the second section is a first of the user's fingers, and the motion data include finger tracking of the first finger.

19. The method of claim 15, further comprising:
mapping the limb and the second section of the user's body to first and second sections of a virtual frame in the virtual environment; and
controlling the movement of the virtual frame by moving the user's body.

20. A method for real-time mapping of a user's body, the method comprising:
wearing multiple wearable articles of a frame on at least the user's torso, arms, and legs such that sensing devices of the wearable article(s) are located on the user's torso, arms, and legs, a first wearable article of the wearable articles being worn on a limb of the user's body and a first sensing device of the sensing devices being mounted to the first wearable article so as to be located at a fixed location along and relative to a bone of the limb of the user's body to enable the first sensing device to track the position and orientation of the limb of the user in three dimensions by sensing the position and orientation of the fixed location of the first sensing device in three dimensions;
mapping each of the sensing devices to corresponding portions of a virtual skeleton frame of an avatar within a virtual environment;
transmitting signals with each of the sensing devices;
receiving the signals with at least one control unit of the frame;
determining movement of the user's torso, arms, and legs based on the signals;
providing motion data comprising the position and orientation of the user's torso, arms, and legs to a virtual environment based on the movement of the user's torso, arms, and legs; and
manipulating the avatar within the virtual environment based on the motion data.

* * * * *